(12) United States Patent
Bochkovskiy et al.

(10) Patent No.: US 7,630,430 B2
(45) Date of Patent: Dec. 8, 2009

(54) METHOD AND APPARATUS FOR ACCELERATING CORRELATION PROCESSING OF GPS SIGNAL

(75) Inventors: Andrey Bochkovskiy, St. Petersburg (RU); Mikhail Goloubev, St. Petersburg (RU); Sergey Pospelov, St. Petersburg (RU); Mikhail Vasilyev, St. Petersburg (RU); Valeri Tchistiakov, St. Petersburg (RU); Mikhail Kholostov, St. Petersburg (RU); Sergey Nozdrachev, St. Petersburg (RU); Nikolay Mikhaylov, St. Petersburg (RU); Bijan Jalali, Irvine, CA (US)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 567 days.

(21) Appl. No.: 11/419,757

(22) Filed: May 22, 2006

(65) Prior Publication Data

US 2007/0019715 A1 Jan. 25, 2007

Related U.S. Application Data

(60) Provisional application No. 60/595,659, filed on Jul. 25, 2005.

(51) Int. Cl.
*H04B 1/00* (2006.01)
(52) U.S. Cl. .................................... 375/150
(58) Field of Classification Search ............. 375/130, 375/142, 145, 149–150, 340, 343; 342/357.07–357.08, 342/357.12; 370/210
See application file for complete search history.

(56) References Cited

U.S. PATENT DOCUMENTS

| 4,701,934 | A | 10/1987 | Jasper |
| 5,329,549 | A | 7/1994 | Kawasaki |
| 5,347,284 | A | 9/1994 | Volpi et al. |
| 5,420,593 | A | 5/1995 | Niles |
| 5,535,237 | A | 7/1996 | LaPadula, III et al. |
| 5,901,171 | A | 5/1999 | Kohli et al. |
| 6,044,105 | A | 3/2000 | Gronemeyer |
| 6,091,785 | A | 7/2000 | Lennen |
| 6,118,808 | A | 9/2000 | Tiemann et al. |
| 6,300,899 | B1 | 10/2001 | King |

(Continued)

FOREIGN PATENT DOCUMENTS

WO WO 00/65751 11/2000

(Continued)

OTHER PUBLICATIONS

Phillip Ward, "GPS Satellite Signal Characteristics", Understanding GPS: Principles and Applications, pp. 83-97 pp. Chapter 4.

*Primary Examiner*—Khanh C Tran
(74) *Attorney, Agent, or Firm*—Winston Hsu

(57) ABSTRACT

A method of increasing speed of digital correlation processing in a global positioning system (GPS) receiver and associated receiver. The method comprises steps of digitizing a received GPS signal at a first rate to obtain digitized samples, storing the digitized samples in a memory at the first rate, reading packs of a predetermined number of digitized samples at a second rate that is faster than the first rate, generating packs of the predetermined number of signal replica samples at the second rate, and correlating the packs of digitized samples from the memory with the generated replica samples at the second rate.

15 Claims, 8 Drawing Sheets

U.S. PATENT DOCUMENTS

| | | |
|---|---|---|
| 6,327,473 B1 | 12/2001 | Soliman et al. |
| 6,452,961 B1 * | 9/2002 | Van Wechel ................ 375/142 |
| 6,496,533 B2 * | 12/2002 | Lennen ....................... 375/147 |
| 7,173,957 B2 * | 2/2007 | Shakeri et al. .............. 375/140 |
| 7,190,712 B2 * | 3/2007 | Abraham et al. ............ 375/150 |
| 7,209,514 B2 * | 4/2007 | Tanaka et al. ............... 375/150 |
| 2002/0005802 A1 | 1/2002 | Bryant et al. |
| 2005/0232380 A1 * | 10/2005 | Valio et al. .................. 375/343 |

FOREIGN PATENT DOCUMENTS

| | | |
|---|---|---|
| WO | WO 01/86318 A1 | 11/2001 |
| WO | WO 02/23327 A1 | 3/2002 |
| WO | WO 02/23783 A1 | 3/2002 |

* cited by examiner

METHOD AND APPARATUS FOR ACCELERATING CORRELATION PROCESSING OF GPS SIGNAL

CROSS REFERENCE TO RELATED APPLICATIONS

This application claims the benefit of U.S. Provisional Application No. 60/595,659, filed Jul. 25, 2005.

BACKGROUND OF THE INVENTION

1. Field of the Invention

This invention generally relates to navigation systems and more specifically to a digital processing method in a receiver and improvements in satellite navigation systems such as the U.S. Global Positioning System (GPS), the Russian Global Navigation Satellite System (GLONASS) and the European Galileo system. For the sake of simplicity, reference will be made below only to the GPS system. The invention is directly applicable to other satellite navigation systems such as GLONASS and Galileo.

2. Description of the Prior Art

A conventional GPS receiver contains an antenna and an analogous front-end (AFE) followed by a digital section having dedicated signal processing circuitry and a digital CPU with related program and data memory and external data interface controllers. The antenna together with the analogous front-end intercept, select (band-pass filter), amplify GPS signals, convert them to a convenient intermediate frequency (IF) normally ranging from DC to several tens of MHz. To perform frequency conversion, the AFE utilizes a reference frequency from a stable reference oscillator. The AFE typically outputs digitized samples of a combination of signals and accompanying noise at IF. The frequency of sampling the AFE output is selected according to the Nyquist criterion, and for the Clear/Acquisition (C/A) GPS signal component is, at least about 2 MHz. A number of bits in digital AFE samples varies from one to three or four bits.

A digital section of the GPS receiver contains several correlator channels that perform correlation processing of several GPS satellite signals in parallel. GPS signals employ phase shift keying modulation with pseudo-random noise codes, see, for example, "Understanding GPS: Principles and Applications. Edited by Elliott D. Kaplan. Artech House, Boston, London, 1996, pp. 83-97". Received signals are characterized by a priori uncertainty of signal parameters: its code phase due to unknown (or not ideally known) time of the signal coming to the receiver, and its carrier frequency due to unknown (or not ideally known) Doppler shift and the reference oscillator frequency drift. Signal search in a GPS receiver, i.e. resolution of the above-mentioned uncertainty, requires time. Many applications of GPS need receivers that are capable of acquiring signals rapidly in difficult signal environments. For example, this can be reception of weak GPS signals indoors and in urban canyons. A short time to acquire these weak signals is important both from a direct viewpoint of a user requirement to get the first position fix as soon as possible, and from the viewpoint of supply energy reduction as a result of a short time-to-first-fix (TTFF).

The first, and straightforward, way to accelerate GPS signal processing in receivers is to increase the number of parallel correlator channels. It is effective (until some practical limit), and it is quite a common practice in design of modern GPS receivers. Examples are: U.S. Pat. No. 5,901,171 to Kohli et al., or PCT Application No. 2000/65751 by Abraham et al., or almost every GPS receiver on the market. The number of parallel correlator channels reaches 12, 24, and sometimes more. Limits of employing this way of signal processing acceleration in GPS receivers arise due to a proportional growth of hardware complexity and consumed energy with the increase of the number of correlator channels.

Another effective way to accelerate signal processing in GPS receivers is to process signals at a faster-than-real-time rate. The fundamental patents claiming this method are: U.S. Pat. No. 5,420,593 to Niles, and U.S. Pat. No. 5,329,549 to Kawasaki. The essence of the method, according to both patents, is that digitized samples of a combination of signal and noise are written into a digital memory at a real-time rate, and then these samples are reproduced from the memory and processed in correlator channels at a significantly higher rate. As a result, a significantly larger amount of candidate signal replicas are tried in a unit of time thus accelerating the overall signal search process. Different receiver options implementing the method can be found, for example, in U.S. Pat. No. 5,901,171 to Kohli et al., U.S. Pat. No. 6,091,785 to Lennen, U.S. Pat. No. 6,044,105 to Gronemeyer, U.S. Pat. No. 6,118,808 to Tiemann, and U.S. Pat. No. 6,300,899 to King. The effect gained with the method is bound by the allowed rate of digital processing that reflects the existing technical level in microelectronics, and/or the acceptable power consumed by the digital processing hardware that is, normally, directly proportional to the processing rate.

The third way to accelerate signal processing in GPS receivers is to implement parallel (pseudo-parallel) spectral analysis of preliminary correlation processing results with the help of a Fast Fourier Transform (FFT) or a Discrete Fourier Transform (DFT) method.

Examples of the use of FFT for acquisition of GPS signals may be found in U.S. Pat. No. 4,701,934 to Jasper, and PCT Application No. 2001/86318 by Bryant et al., or U.S. Pat. Application No. 2002/0005802 by Bryant.

Examples of the use of DFT for acquisition of GPS signals may be found in U.S. Pat. No. 5,347,284 to Volpi et al., U.S. Pat. No. 5,535,237 to Volpi et al., PCT Application No. 2002/23327 by Van Wechel, PCT Application No. 2002/23783 by van Wechel, and U.S. Pat. No. 6,327,473 to Soliman et al.

The above-described third way to accelerate signal processing in GPS receivers also has its bounds of effective use. First, complexity of hardware implementing DFT or FFT grows with the increase of the number of frequency bins analyzed in parallel. Second, not every application of a GPS receiver requires an increase of frequency search bins.

SUMMARY OF THE INVENTION

An objective of the present invention is to provide a method and apparatus for accelerated correlation processing of GPS signals.

A method of increasing speed of digital correlation processing in a receiver of global positioning system (GPS) signals includes digitizing a combination of GPS signals and receiver noise at a first rate to obtain digitized samples, storing the digitized samples in a memory at the first rate, reading packs of a predetermined number of digitized samples at a second rate that is faster than the first rate, generating packs of the predetermined number of signal replica samples at the second rate, and correlating the packs of digitized samples from the memory with the generated replica samples at the second rate.

A global positioning system (GPS) receiver comprises a radio frequency (RF) front-end for producing digital samples of a combination of GPS signals and receiver noise at an intermediate frequency; a digital down-converter, coupled to the RF front-end, for bringing to baseband and low-pass filtering the digital samples; a signal memory, coupled to the digital down-converter, for storing packs of a predetermined number of baseband digital samples output by the digital down-converter; a plurality of correlator channels, coupled to the signal memory, for calculating correlations between the packs of baseband digital samples and packs of generated signal replica samples, and for forming statistics for deriving signal parameters accordingly; an acquisition engine, coupled to the correlator channels, for calculating a fast Fourier transform (FFT) of the correlations, for incoherent accumulation of results of the FFT, and further for comparing the results against a threshold; and a common random access memory (RAM), coupled to the correlator channels and the acquisition engine, for storing the correlations from the correlator channels, storing the correlator channel status at instants when the threshold is exceeded, and storing a correlator channel setting.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

This invention is illustrated by means of accompanying drawings. However, these figures represent examples of the invention and do not serve to limit its applicability.

DETAILED DESCRIPTION

Figure 1:
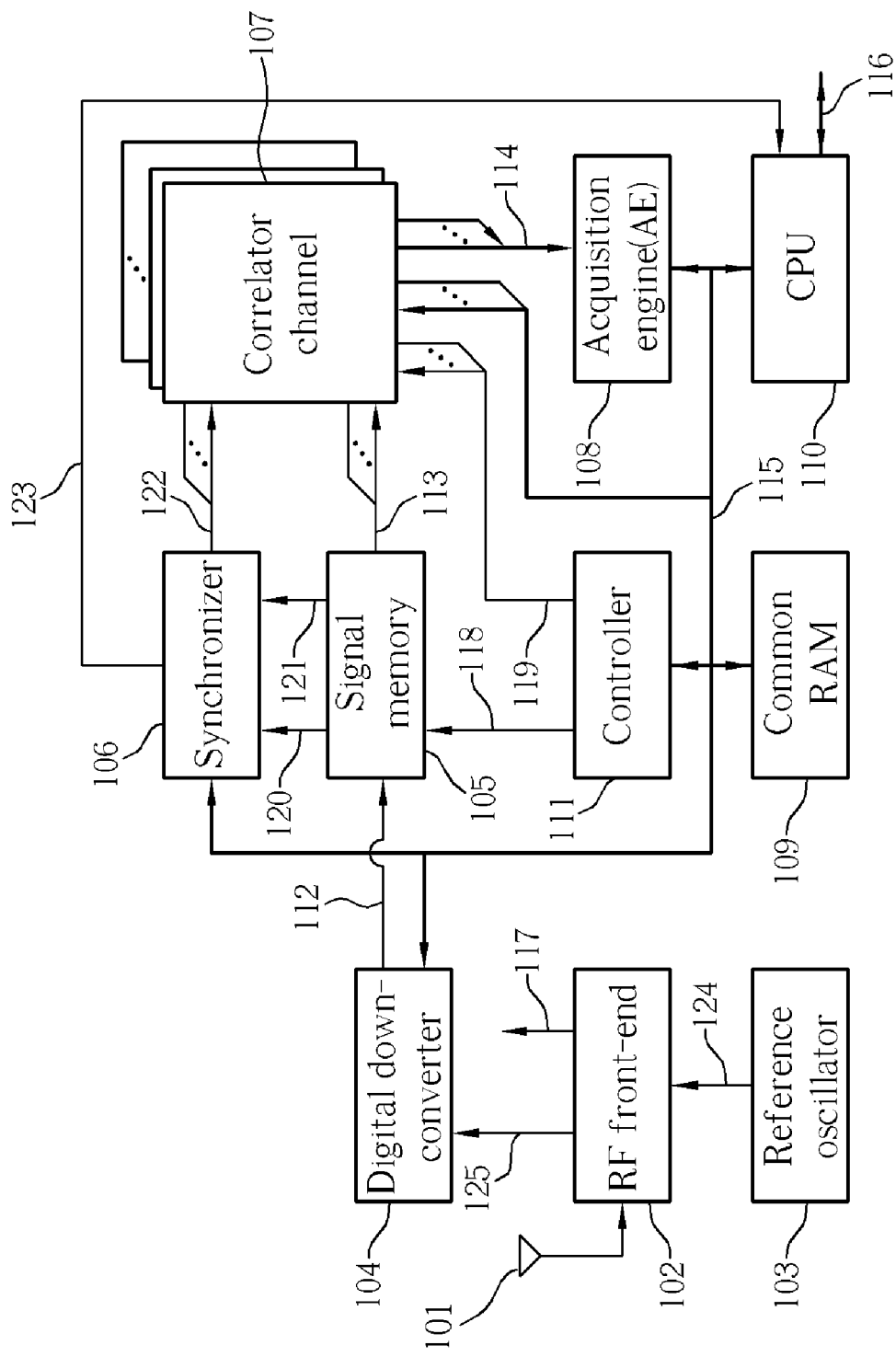
FIG. 1 is a block diagram of a GPS receiver according to an embodiment of the present invention.

FIG. 1 illustrates a block diagram of a GPS receiver according to an embodiment of the present invention that comprises an antenna 101, a radio frequency (RF) front-end (FE) 102 with a connected reference oscillator 103, a digital down-converter 104, a signal memory 105, a synchronizer 106, a group of connected in parallel correlator channels 107, an acquisition engine (AE) 108, a common random access memory (RAM) 109, a CPU with a memory and a user interface 116, and a controller 111. The CPU 110 is coupled with the digital down-converter 104, with the correlator channels 107, with the common RAM 109, and with the controller 111 by a common data bus 115.

The RF FE 102 of a GPS receiver, for example, comprises amplifier elements, including a low-noise input amplifier; band-pass filters for preliminary frequency selection of signals from noise and interference; one or more stages of signals frequency down-conversion; a frequency synthesizer for deriving local oscillator frequency from the reference oscillator 103 frequency, the same synthesizer also generating a digital clock 117 (main clock) to run all the digital processing throughout the receiver; and an output analog-to-digital converter of the signal at intermediate frequency, for example, with a number of conversion bits from 1 to 3, and with a single (real) or a complex pair of outputs 124. Preferably, the RF FE 102 utilizes a single stage of frequency conversion. The reference oscillator 103 is a crystal oscillator with a relative instability of 2-30 parts per million.

Figure 7:
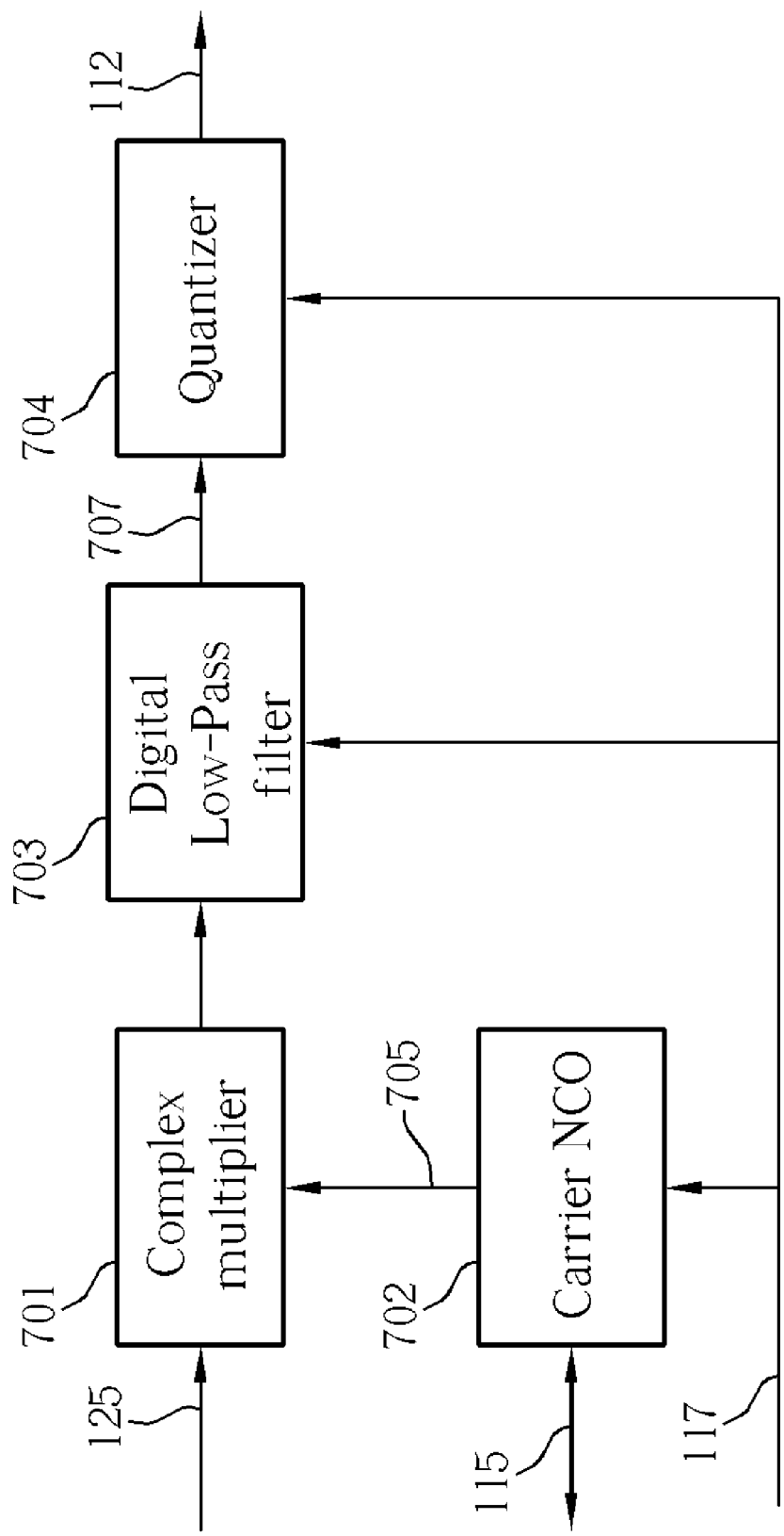
FIG. 7 is a block diagram of the digital downconverter in accordance with an embodiment of the present invention.

FIG. 7 shows a block diagram of the digital down-converter (DDC) 104 according to one preferred embodiment of the present invention. The digital down-converter (DDC) 104 comprises a complex multiplier 701, a carrier numerically-controlled oscillator (NCO) 702, a digital low-pass filter 703, and a quantizer 704. The input 125 of the complex multiplier 701 represents the signal input of the DDC 104. An output 112 of the quantizer 704 represents the signal output of the DDC 104. Inputs of the carrier NCO 702 and of the digital low-pass filter 703 receive the clock input of the DDC 104 and are connected to the clock output 117 of the RF FE 102. The complex multiplier 701 together with the carrier NCO 702 convert digital samples of the combination of GPS signals and noise from the IF to baseband. The digital low-pass filter 703 filters away aliases. The quantizer 704 determines the number of bits in the signal output 112 of the DDC 104 to be further stored in the signal memory 105. Preferably, the carrier NCO 702 produces complex samples 705 of a frequency close to the IF commanded via the digital data bus 115. The carrier NCO 702 operates at the clock rate of the RF FE 102 output signal 117. The complex multiplier 701 can be implemented either based on digital multiplying and (algebraic) summing, wherein the number of bits is defined by the RF FE 102 output 125, or by utilizing a look-up table of all possible combinations of input sample values. The digital low-pass filter (LPF) 703 can be implemented as a quadrature pair of finite impulse response filters based on register delay lines with 64 taps each and a 9-bit representation of filter coefficients.

Implementation of the quantizer 704 depends on the choice of the number of bits in the samples to be stored in the signal memory 105. For single bit samples, the quantizer 704 degenerates to a circuit just passing to its output the sign bit of the digital LPF 703 output signal 707. In the preferred embodiment, for a 2-bit output samples representation, an additional comparator is included in the quantizer 704. A simple digital filter based on an accumulator, for example, can derive the threshold for the comparator. Added or subtracted accumulation constants define the desired relationship of output samples 707 that exceed, or not exceed, the threshold. For example, the relationship 30% to 70% for exceed to not exceed samples is commonly regarded to be close to the optimum. Then, if the threshold is exceeded, the accumulator is diminished by 7, and, if it is not exceeded, the accumulator is increased by 3. The most significant bits of the accumulator comprise the threshold value. The number of bits in the accumulator and the clocking rate define the filter time constant of the quantizer 704.

Figure 3:
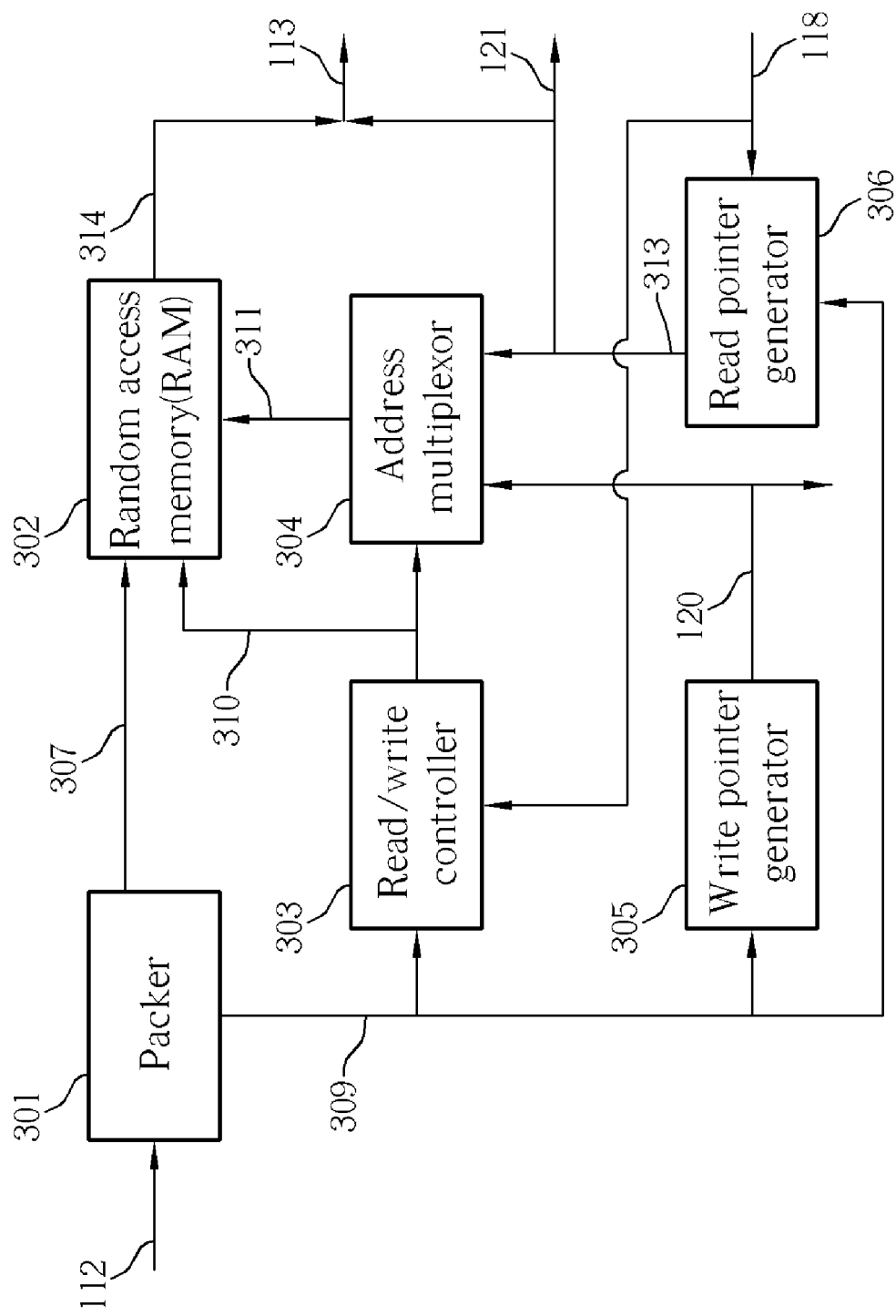
FIG. 3 is a block diagram of the signal memory in accordance with an embodiment of the present invention.

FIG. 3 shows a block diagram of the signal memory 105 according to the preferred embodiment of the present invention. The signal memory 105 comprises a packer 301, a random access memory (RAM) 302, a read/write controller 303, an address multiplexor 304, a write pointer generator 305, and a read pointer generator 306. The input of the packer 301 represents the signal memory 105 input 112. Data output 314 of the RAM 302 and the output 313 of the read pointer generator 306 represent the output 113 of the signal memory 105. Complex samples of the signal 112 that come from the DDC 104 at a sampling rate matched with its pass band are combined within the packer 301 into packs of several (N) samples, for example, four or eight complex samples. The RAM 302 can be a single ported one, for example, with a number of bits corresponding to the length of packs. For example, for a 2-bit quantizing of samples, and the length of packs equal to four, each pack (either 307 or 314) occupies 16 bits to store both in-phase and quadrature components. Preferably, regarding the read/write control, the signal memory 105 is implemented as a cyclic buffer. Packs are written into the RAM 302 and are read from it by cyclically changing (to the same direction) addresses 311 provided by the address multiplexor 304 from the write pointer 312 or from the read pointer 313 depending on the current operation (write or read) 310 defined by the read/write controller 303. The write pointer generator 305 and the read pointer generator 306 can be implemented, for example, as counters. The state of the write pointer generator 305 is incremented with a validity signal 309 of another sample pack 307. The state of the read pointer generator 306 is incremented with every read clock, if the signal 118 enabling reads is valid. Let C denote the clock rate of the receiver digital part, S denotes the sampling rate, and N denotes the number of samples in a pack. Then, the number of read cycles throughout the whole RAM volume during one whole write cycle to this same RAM can be expressed as $C*N/S-1$. For example, for the clock rate C=50 MHz, the sample rate S=2.048 MHz, and the number of samples in a pack N=4, during one complete write cycle to the RAM 302, approximately 96.6 complete read cycles from the RAM 302 are executed.

In the preferred embodiment of the present invention, the synchronizer 106 gets the write pointer 120 and read pointer 121 codes from the signal memory 105, and is controlled from the CPU 110 via the data bus 115. The synchronizer 106, after a fixed number of write pointer 120 steps, latches the code of the write pointer 120, generates a signal 122 on every occurrence of the read pointer 121 equal to the latched value of the write pointer during a whole cycle of the write pointer 120 started and finished on its latched value, and generates an interrupt 123 for the CPU after the burst of the signal 122 pulses.

In FIG. 1, parallel correlator channels 107 can be identical. Their inputs are connected to the output 113 of the signal memory 105, and their outputs are combined in a data bus 114 that is coupled to the acquisition engine 108.

Figure 2:
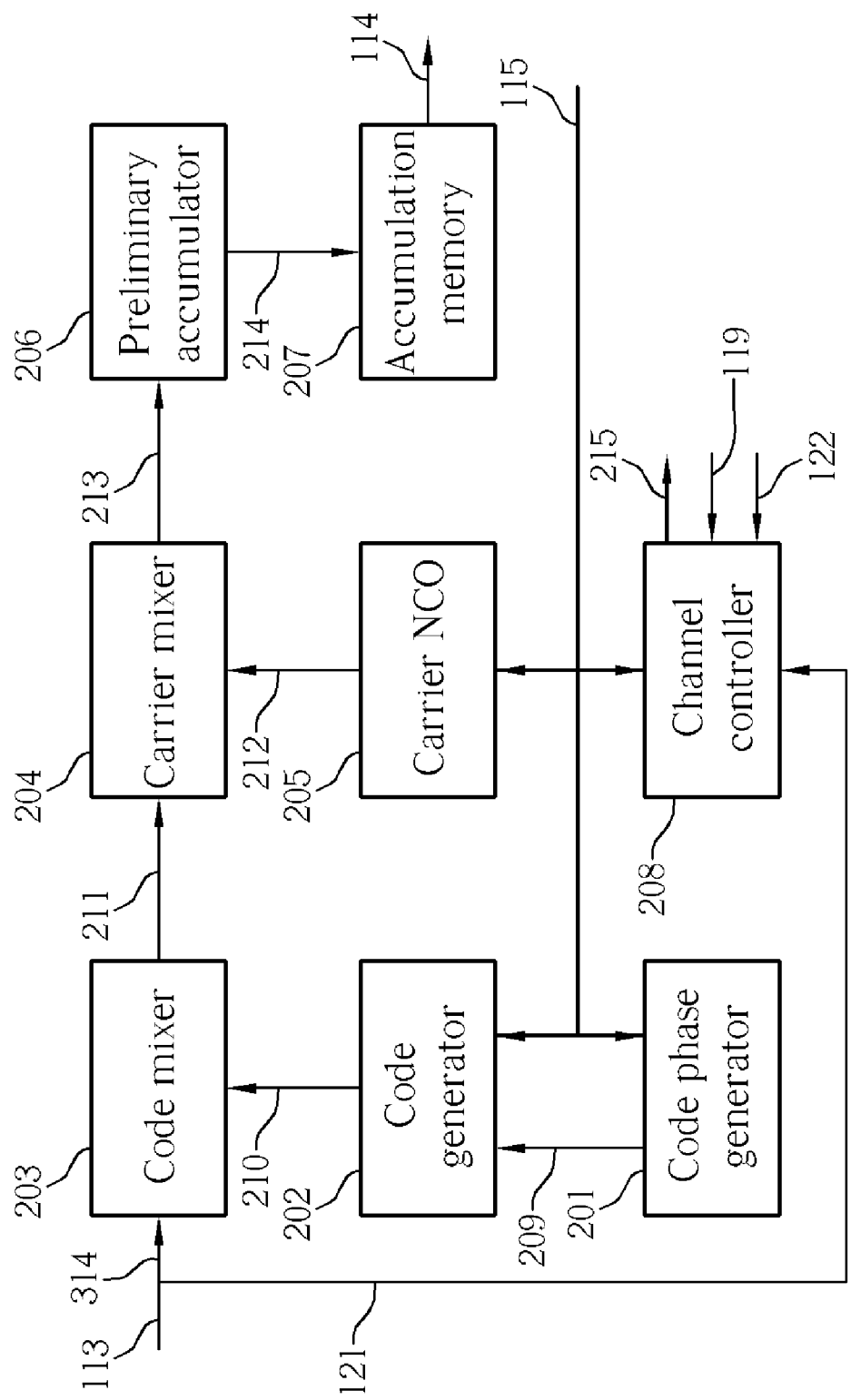
FIG. 2 is a block diagram of the correlator channel in accordance with an embodiment of the present invention.

FIG. 2 shows a block diagram of the correlator channel 107 according to a preferred embodiment of the present invention. The correlator channel 107 comprises a code phase generator 201, a code generator 202, a code mixer 203, a carrier mixer 204, a carrier NCO 205, a preliminary accumulator 206, accumulations memory 207, and a channel controller 208. The code phase generator 201 calculates a fine code phase, a current chip advance, and a code chip relation to the samples of a current pack. The code generator 202, driven by the code phase generator 201, produces packs of the signal replica 210, advancing the GPS C/A code by several chips at each clock. The packs of the signal replica 210 are multiplied in the code mixer 203 with the corresponding received sample packs 113. The results within the packs are summed (signal 211) and further multiplied (in the carrier mixer 204) by the replica carrier samples 212 produced in the carrier NCO 205 while de-spreading in the code mixer 203 significantly narrows signal spectrum on signal 211. After the carrier mixer 204, output signal samples 213 are averaged in the preliminary accumulator 206 throughout a time interval defined by the a priori uncertainty of signal frequency. Accumulations memory 207 stores a batch of consecutive results 214 from the preliminary accumulator 206 to be further processed in the acquisition engine 108. The length of the batch is coordinated with the number of points in the Fourier transform performed in the acquisition engine 108. The code phase generator 201 produces a signal 209 required to advance the code generator 202 by calculating the value of code phase advance throughout the interval corresponding to the length of sample packs 113 and 210. Preferably, the code generator 202, on each clock, produces a pack of the local signal replica 210 comprising several single-bit code samples.

The code mixer 203 multiplies input pack 113 complex pairs of samples (1-3 bits) by corresponding single-bit samples of code replica 210 coming from the code generator 202, and adds arithmetically the products throughout the pack separately for in-phase and quadrature components. Various implementations of the code mixer 203 can be made by those skilled in the art, for example, accounting for only a few bits representing the operands. Implementation of the carrier NCO 205 of the correlator channel 107 is similar to that of the carrier NCO 702 of the DDC 104. Besides that, the carrier NCO 205 contains a register that holds the carrier phase value latched at a measurement epoch defined by the synchronizer 106 and enabled by the channel controller 208.

The carrier mixer 204 can be implemented either based on digital multiplying and (algebraic) summing, wherein the number of bits is defined by the code mixer 203 output 211 and carrier replica samples 212, or by utilizing a look-up table of all possible combinations of input sample values. The number of bits at the output 213 of the carrier mixer 204 depends on that of the inputs 211 and 212. For example, for two bits at the input 113 of the channel correlator 107, four samples in a pack, and five bits of the local carrier replica representation, the number of bits of the result at the output 213 of the carrier correlator 204 is equal to eight.

The preliminary accumulator 206 separately accumulates the in-phase and quadrature components of complex output 213 of the carrier mixer 204 throughout a predefined interval of coherent accumulation. The interval is defined by the CPU 110, and transferred to the channel controller 208 via the common digital data bus 115 either directly or through the controller 111. The channel controller 208 enables starting processing in the channel when the read pointer 313 from the signal memory 105 reaches the value coinciding with the predetermined one, and disables processing after a predetermined number of processing steps. The channel controller 208 enables also, allowed by the CPU control, applying measurement epoch signals 122 to the code phase generator 201 and the carrier NCO 205. Throughout processing, the channel controller 208 enables accumulation by the preliminary accumulator 206 over the predefined interval, commands transferring the accumulations 214 to the accumulations memory 207, and commands resetting the preliminary accumulator 206, after which the latter is ready for a new accumulation cycle. The above mentioned and all other necessary controls by the channel controller 208 are represented in FIG. 2 as a generalized signal line 215. For example, the accumulation interval is equal to $\frac{1}{16}$ ms (i.e. the C/A code epoch) that enables accumulation coherency of the received signals that fall into a band of ±8 kHz. Preferably, the accumulations memory 207 comprises two identical sections, one being filled with new accumulations 214, while another is available for reading from the acquisition engine 108. The volume of each section of the accumulations memory 207 is sufficient to store a number of accumulations that can be processed by the acquisition engine 108 in a single invocation. For example, the volume of each section of the accumulations memory 207 is equal to 32 complex results that corresponds, with the accumulation interval of 1/16 ms, to a 2 ms long accumulations batch stored.

Figure 4:
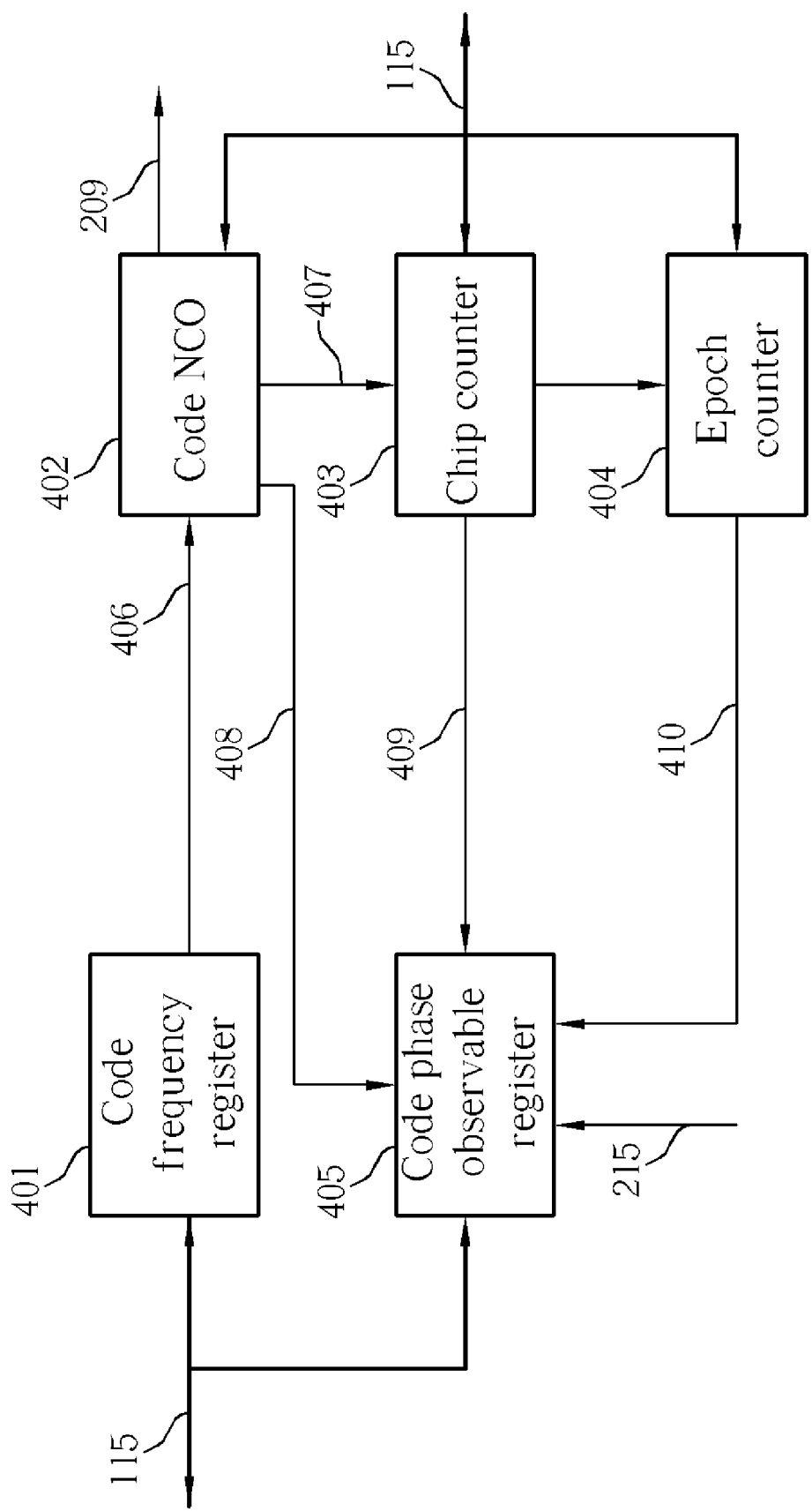
FIG. 4 is a block diagram of one embodiment of the code phase generator of the correlator channel of FIG. 2 according to an embodiment of the present invention.

FIG. 4 shows a block diagram of the code phase generator 201 according to a preferred embodiment of the present invention. The code phase generator 201 comprises a code frequency register 401, a code NCO 402, a chip counter 403, an epoch counter 404, and a code phase observable reregister 405. The code NCO 402 advances the code phase fractional part. The output of the code NCO 402 represents the output 209 of the code phase generator 201. The code phase generator 201 is preferably initialized via the common digital data bus 115. In this embodiment, the code NCO 402 comprises an NCO based on a 32-bit binary adder, and the overflow of the code NCO 402 drives the chip counter 402. The 10 MSB and the overflow of the code NCO 402 form the output 209 to the code generator 202. The chip counter 403 comprises a modulo-1023 10-bit counter of the GPS C/A code chips. The epoch counter 404 advances a code phase integer epoch part. It counts the carry events from the chip counter 403 (code epochs). The epoch counter's 404 modulo is equal to the volume of the signal memory 105 expressed as a number of C/A code epochs. The code phase observable register 405 latches the code phase value comprising a chip fractional part 408, chip integer part 409, and code epochs 410 at a measurement epoch defined by the synchronizer 106 and enabled by the channel controller 208.

Figure 6:
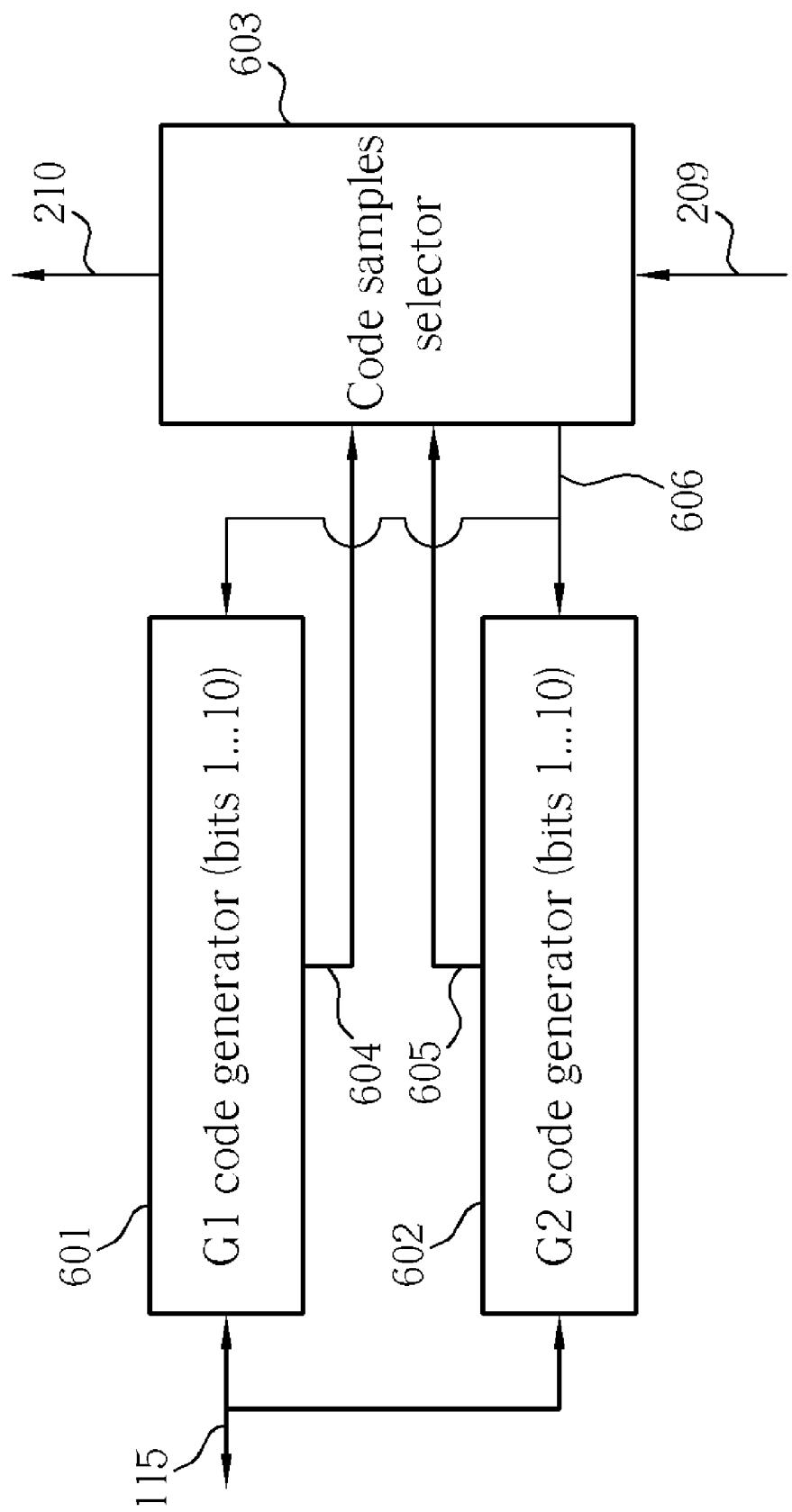
FIG. 6 is a block diagram of the code generator of the correlator channel of FIG. 2 according to an embodiment of the present invention.

In FIG. 2, the code generator 202, which is sometimes referred to as a pseudo-random number generator, comprises a 10-bit G1 code generator 601, G2 code generator 602, and a code sample selector 603. FIG. 6 shows a block diagram of the code generator 202 according to a preferred embodiment of the present invention. The G1 and G2 code generators 601 and 602 are initialized via the common digital bus 115. Outputs 604 and 605 of the code generators 601 and 602 are connected to the code samples selector 603. The advance step 606 of the code generators 601 and 602 is commanded from the code samples selector 603. For example, with a pack length of 4 samples, the G1 and G2 code generators 601 and 602 produce either two or one C/A code chips per clock. With a pack length of 8 samples, the G1 and G2 code generators 601 and 602 produce either four or three C/A code chips per clock. The pack length can be any value, with 4 and 8 merely being examples. The G1 and G2 code generators 601 and 602 can be implemented by shift registers with linear feedback, with reference to GPS C/A code generators described, for example, in "Understanding GPS: Principles and Applications. Edited by Elliott D. Kaplan. Artech House, Boston, London, 1996, pp. 90-94" that generate always one code chip per clock. In this embodiment, the difference lies in the feedback. For the case of 4 samples in a pack, the feedback logic is presented in Table 2; and for the case of 8 samples in a pack, the feedback logic is presented in Table 3; where In.1-In.10 are register inputs (from the 1st till 10th) of the G1 and G2 code generators 601 and 602; numbers (1-10) inside the tables are the register outputs (from the 1st till the 10th) of the G1 and G2 code generators 601 and 602; variable C is the carry output of the code NCO 402 pack phase adder output; F1-F8 values are calculated, as described in Table 1 below, where $(x+y+ \ldots) \mod 2$ denotes modulo-2 summing (exclusive-OR operation). It should be noted that since the code samples selector 603 of the code generator 202 generates a sample pack 210 of predetermined size N (i.e., 4, 8, etc), the physical connections for the signals 210, 211, 213 should be N-bit. This can be achieved by N data traces in parallel, for example. This N-bit operation improves the efficiency over the prior art.

TABLE 1

| | |
|---|---|
| F1 = (3 + 10) mod2 | F5 = (2 + 3 + 6 + 8 + 9 + 10) mod2 |
| F2 = (2 + 9) mod2 | F6 = (1 + 2 + 5 + 7 + 8 + 9) mod2 |
| F3 = (1 + 8) mod2 | F7 = (1 + 2 + 3 + 4 + 7 + 9 + 10) mod2 |
| F4 = (3 + 7 + 10) mod2 | F8 = (1 + 10) mod2 |

TABLE 2

| Code | G1 | G1 | G2 | G2 |
|---|---|---|---|---|
| C | 0 | 1 | 0 | 1 |
| In. 1 | F1 | F2 | F5 | F6 |
| In. 2 | 1 | F1 | 1 | F5 |
| In. 3 | 2 | 1 | 2 | 1 |
| In. 4 | 3 | 2 | 3 | 2 |
| In. 5 | 4 | 3 | 4 | 3 |
| In. 6 | 5 | 4 | 5 | 4 |
| In. 7 | 6 | 5 | 6 | 5 |
| In. 8 | 7 | 6 | 7 | 6 |
| In. 9 | 8 | 7 | 8 | 7 |
| In. 10 | 9 | 8 | 9 | 8 |

TABLE 3

| Code | G1 | G1 | G2 | G2 |
|---|---|---|---|---|
| C | 0 | 1 | 0 | 1 |
| In. 1 | F3 | F4 | F7 | F8 |
| In. 2 | F2 | F3 | F6 | F7 |
| In. 3 | F1 | F2 | F5 | F6 |
| In. 4 | 1 | F1 | 1 | F5 |
| In. 5 | 2 | 1 | 2 | 1 |
| In. 6 | 3 | 2 | 3 | 2 |
| In. 7 | 4 | 3 | 4 | 3 |
| In. 8 | 5 | 4 | 5 | 4 |
| In. 9 | 6 | 5 | 6 | 5 |
| In. 10 | 7 | 6 | 7 | 6 |

Figure 5:
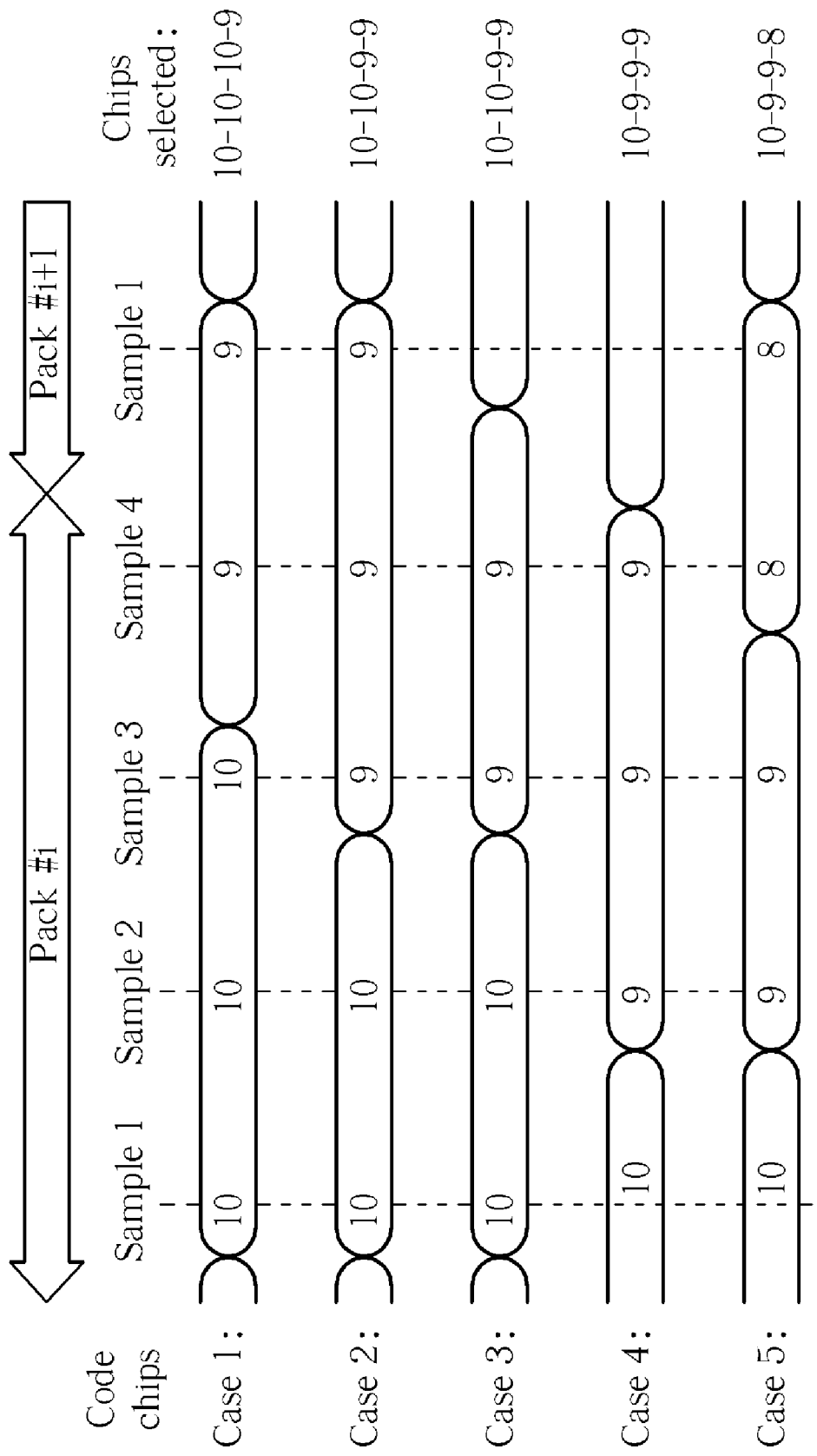
FIG. 5 illustrates alternative alignments of the boundaries of C/A code chips and a pack of four discrete signal samples in the correlator channel of FIG. 2.

In one attractive embodiment of the present invention, the sample rate is 2.048 MHz, while the average code clock rate is 1.023 MHz. This means that, in time, the code chip borders slide with respect to the samples, so that two samples fall into each of the major part of the code chips, and, from time to time, three samples fall into the code chip, as shown in FIG. 5. Five different cases are depicted, which cover all principal combinations of samples falling into the borders of the code chips. To account for all the combinations, the code samples selector 603 provides sample values S1-S8 according to Table 4, which covers both the option with four (S1-S4) and eight (S1-S8) samples in packs.

TABLE 4

| Code Phase (10-bit) | S1 | S2 | S3 | S4 | S5 | S6 | S7 | S8 |
|---|---|---|---|---|---|---|---|---|
| 0 | 10 | 10 | 10 | 9 | 9 | 8 | 8 | 7 |
| 1 | 10 | 10 | 9 | 9 | 9 | 8 | 8 | 7 |
| 2 | 10 | 10 | 9 | 9 | 8 | 8 | 8 | 7 |
| 3 | 10 | 10 | 9 | 9 | 8 | 8 | 7 | 7 |
| ... | ... | ... | ... | ... | ... | ... | ... | ... |
| 512 | 10 | 10 | 9 | 9 | 8 | 8 | 7 | 7 |
| 513 | 10 | 9 | 9 | 9 | 8 | 8 | 7 | 7 |
| 514 | 10 | 9 | 9 | 8 | 8 | 8 | 7 | 7 |
| 515 | 10 | 9 | 9 | 8 | 8 | 7 | 7 | 7 |

TABLE 4-continued

| Code Phase (10-bit) | S1 | S2 | S3 | S4 | S5 | S6 | S7 | S8 |
|---|---|---|---|---|---|---|---|---|
| 516 | 10 | 9 | 9 | 8 | 8 | 7 | 7 | 6 |
| ... | ... | ... | ... | ... | ... | ... | ... | ... |
| 1023 | 10 | 9 | 9 | 8 | 8 | 7 | 7 | 6 |

The code sample selector 603 selects the sample meanings of the current pack according to the rules described by Table 4.

In Table 4 above, the numbers (from 6 to 10) are the XOR'ed logic values of the corresponding register bit pairs from the G1 and G2 code generators 601 and 602. Corresponding rules for different number of samples in packs and other sampling rate values will, no doubt, become apparent to those skilled in the art.

Figure 8:
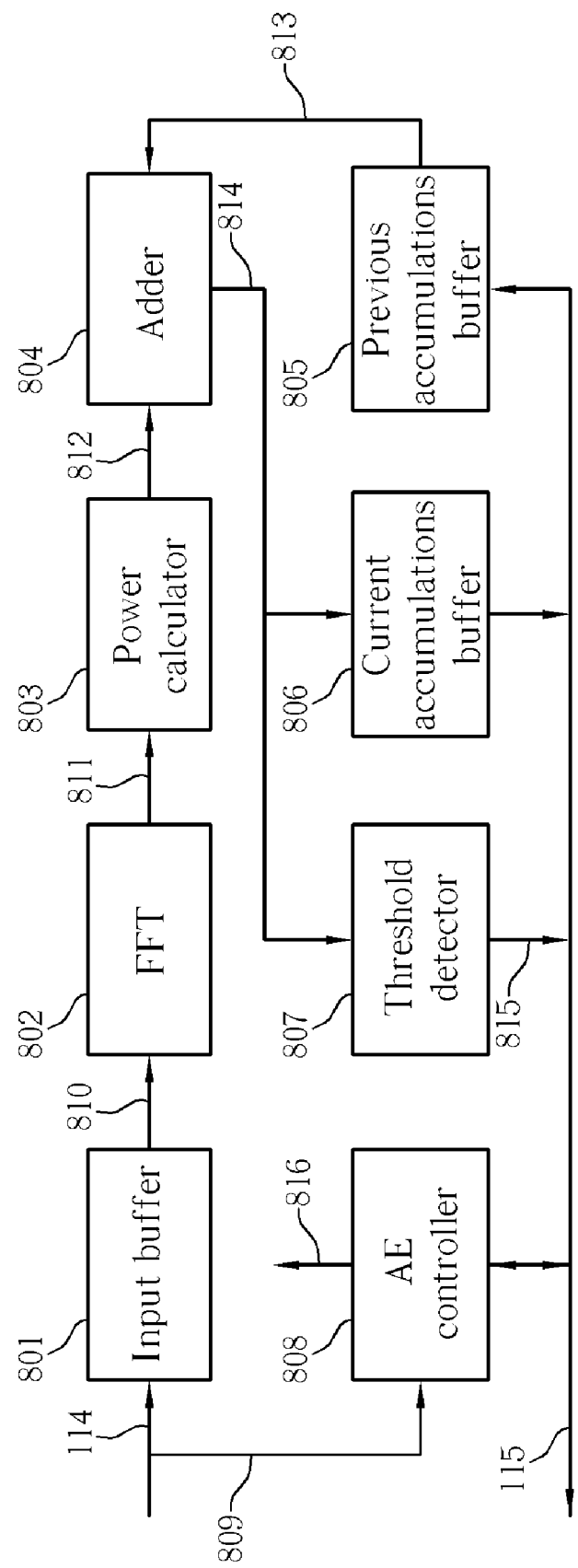
FIG. 8 is a block diagram of the acquisition engine in accordance with one embodiment of the present invention.

FIG. 8 shows a block diagram of the acquisition engine (AE) 108 according to a preferred embodiment of the present invention. The acquisition engine (AE) 108 comprises an input buffer 801, an FFT 802, a power calculator 803, an adder 804, a previous accumulation buffer 805, a current accumulation buffer 806, a threshold detector 807, and an AE controller 808. The acquisition engine 108, due to its high processing efficiency, sequentially serves the requests from all the correlator channels 107. After a correlator channel 107 has processed a predetermined batch of signal packs, the correlator channel 107 issues a request 809 to the acquisition engine 108, and the latter downloads preliminary accumulations 114 from the correlator channel 107 into the input buffer 801, applies the FFT 802 to the buffered data 810, converts the obtained amplitude spectrum 811 with the power calculator 803 into a power spectrum 812, adds these powers 812 to the previous accumulations 813 from the previous accumulation buffer 805, places the results 814 into the current accumulation buffer 806 and compares the results 814 against a predetermined threshold in the threshold detector 807. Simultaneously with the downloading of new previous accumulations from the common RAM 109 and new preliminary accumulations 114 from another correlator channel 107, the current accumulation buffer 806 is uploaded into the common RAM 109. When results exceed the threshold, the correlator status, including the code and frequency search bin numbers, are also downloaded to the common RAM 109.

In a preferred embodiment of the present invention, the FFT 802 transforms batches of 32 (zero-padded up to 64) complex (I and Q) 32-bit fixed-point preliminary accumulations 114 into 64 complex spectral components. High processing efficiency of the FFT 802 is gained due to a parallel processing, for example, implementing a radix-4 FFT. This means that in one clock cycle the FFT 802 processes 4 preliminary accumulations 114. The input buffer 801 is implemented like a first-in-first-out (FIFO) buffer of depth 64, with a single 2×32-bit input of complex data 114 and four 2×32-bit outputs connected to four FIFO taps separated in depth by 16 words, thus forming a concatenated 2×128-bit data output 810. The power calculator 803 calculates the squares of complex components 811, four values per clock. In this embodiment, the power calculator 803 comprises four complex multipliers based on arithmetic multipliers and adders. The adder 804 comprises four arithmetic adders. The format of current and previous accumulations 813 and 814 summed in the adder 804 may differ from the format of those stored in the common RAM 109 and in the accumulation buffers 805 and 806. For example, the adder 804 operates with portions of four 32-bit fixed-point words, and the results are stored in the common RAM as pairs of 16-bit floating-point words. Converting formats is an additional function of the accumulation buffers 805 and 806. The previous accumulation buffer 805 and the current accumulation buffer 806 can be implemented in different ways by those skilled in the art. The threshold detector 807 comprises a register of the threshold value, four subtractors that compare four current accumulations 814 against the threshold, and a logic circuit that generates a record 815 with numbers of frequency bins where the accumulations exceed the threshold. The AE controller 808 accepts the requests from the correlator channels 107 and generates sequences of control signals 816 enabling the above interaction of the AE 108. Preferably, the common RAM 109 comprises a standard single-ported random access memory of 8K 32-bit words. The CPU 110 can be selected from a wide range of 32-bit processors either with fixed or with floating-point, for example, TMS320C31, ADSP21060, ARM7TDMI or further supporting a data interface complying with RS-232c, USB or another standard.

Preferably, the controller 111 initializes the correlator channels 107 to perform a correlation processing task of a next batch of signal sample packs 113 by downloading a new correlator channel setting from the common RAM 109 to the correlator channels 107, and uploading the current correlator channel setting to the common RAM 109 to reserve a possibility to revert to the suspended correlation processing task with a new batch of signal sample packs 113, and transfers, as an option, preliminary accumulations 114 from the correlator channels 107 to the common RAM 109. The controller 111 operation is synchronized with the signal memory 105 filling with sample packs. Output control signals of the controller 111 are represented in FIG. 1 by the lines 118 and 119. In the framework of the current invention, various implementations of the controller 111 are possible. One attractive implementation is based on the use of a digital microcontroller that performs all actions to control the correlator channels 107 according to a program stored in the internal memory of the microcontroller.

The present invention accelerates the correlation processing of GPS signals. The acceleration factor is defined by the length of the processed packs of samples. In the disclosed embodiments of the present invention, four-fold and eight-fold acceleration factors are gained. The invention is not limited to these values. While the particular embodiment of the apparatus for accelerating correlation processing has been disclosed above for GPS signals, it can also be applicable to other spread spectrum signals, for example, used in communication systems. Various alterations and modifications will no doubt become apparent to those skilled in the GPS art after having read the above disclosure. Accordingly, it is intended that the appended claims be interpreted as covering all alterations and modifications that fall within the true spirit and scope of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of increasing speed of digital correlation processing for use in a positioning receiver, the method comprising:
  digitizing a received spread spectrum signal at a first rate to obtain a plurality of digitized samples;
  storing the digitized samples in a memory at the first rate;

reading a pack of a predetermined number of digitized samples at a second rate that is faster than the first rate;

generating a pack of the predetermined number of signal replica samples at the second rate;

calculating correlations between the pack of digitized samples and the pack of replica samples at the second rate;

calculating a fast Fourier transform (FFT) of the correlations;

calculating incoherent accumulation of results of the FFT; and comparing the results of the FFT against a threshold.

2. The method of claim 1 wherein the second rate is four, eight, or sixteen times the first rate.

3. The method of claim 1 wherein the spread spectrum signal is a global positioning system (GPS) signal.

4. The method of claim 1 wherein the correlating step generates a correlation result by correlating the pack of digitized samples with the generated replica sample, and generates a plurality of signal parameters according to said correlation result.

5. The method of claim 4 wherein the signal parameters are associated with a receiver position, velocity, or time.

6. The method of claim 1 further comprising storing the correlations, a correlator channel status when the threshold is exceeded, and a correlator channel setting into a common random access memory (RAM).

7. A global positioning system (GPS) receiver comprising:

a radio frequency (RF) front-end for producing a plurality of digital samples of a received GPS signal at an intermediate frequency;

a digital down-converter, coupled to the RF front-end, for bringing to baseband and low-pass filtering the digital samples;

a signal memory, coupled to the digital down-converter, for storing a plurality of packs of a predetermined number of baseband digital samples output by the digital down-converter;

a plurality of correlator channels, coupled to the signal memory, for calculating correlations between the packs of baseband digital samples and a plurality of packs of generated signal replica samples to generate a plurality of signal parameters accordingly;

an acquisition engine, coupled to the correlator channels, for calculating a fast Fourier transform (FFT) of the correlations, for incoherent accumulation of results of the FFT, and further for comparing the results against a threshold; and a common random access memory (RAM), coupled to the correlator channels and the acquisition engine, for storing the correlations from the correlator channels, storing a correlator channel status when the threshold is exceeded, and storing a correlator channel setting.

8. The receiver of claim 7 further comprising:

a synchronizer, coupled to the signal memory and the plurality of correlator channels, for generating signal measurement epoch and interrupt;

a controller, coupled to the signal memory, the correlator channels, and the common RAM, for tuning the correlator channels to generate the packs of signal replica samples according to the correlator channel setting, and further synchronizing operation of the signal memory and the correlator channels; and a processor with a memory and a user interface, coupled with the synchronizer, controller, and the common RAM, for computing the correlator channel setting, for processing of the statistics to derive parameters of the received signal, and for determining a receiver position, velocity, or time.

9. The receiver of claim 7, wherein the signal memory comprises:

a packer, coupled to the digital down-converter, for combining the digital samples into packs of a predetermined number of digital samples;

a random access memory (RAM), coupled to the packer, for storing the packs of samples;

an address multiplexor, coupled to the RAM;

a write pointer generator, coupled to the address multiplexor and synchronized to packer operation, for generating a plurality of addresses into which the packs of samples are written; and a read pointer generator, coupled to the address multiplexor and synchronized to the packer operation, for generating a plurality of addresses from which the packs of samples are read; a read/write controller, coupled to the RAM and the address multiplexor and synchronized to the packer operation, for commanding a read/write RAM mode and selecting a read/write address in the address multiplexor.

10. The receiver of claim 7, wherein each correlator channel comprises:

a code phase generator for calculating a fine code phase, a current code chip advance, and a code chip relation to the samples of a current pack;

a code generator, coupled to the code phase generator, for generating a GPS C/A code, advancing the GPS C/A code by several chips, and assigning code chips to the samples of the current pack;

a code mixer, coupled to the signal memory and to the code generator, for mixing packs of input samples and packs of signal replica samples from the code generator, and for outputting de-spread signal samples;

a carrier NCO for generating signal replica carrier samples;

a carrier mixer, coupled to the code mixer and to the carrier NCO, for mixing the de-spread signal samples from the code mixer and the signal replica carrier samples from the carrier NCO;

a preliminary accumulator, coupled to the carrier mixer, for accumulating samples from the carrier mixer output over a definite time interval; and an accumulations memory, coupled to the preliminary accumulator, for storing a batch of accumulations from the preliminary accumulator.

11. The receiver of claim 10, wherein connections between the code generator, code mixer, carrier mixer, and preliminary accumulator have a bit size equal to the predetermined number.

12. The receiver of claim 10, wherein the code phase generator comprises:

a code frequency register for storing a code frequency value;

a code NCO, coupled to the code frequency register, for advancing the a code phase fractional part;

a chip counter, coupled to the code NCO, for advancing a code phase integer chip part; an epoch counter, coupled to the chip counter, for advancing a code phase integer epoch part; and a code phase observable register, coupled to the code NCO, to the chip counter, and to the epoch counter, for latching and storing a code phase value at a measurement epoch.

13. The receiver of claim 10, wherein the code generator comprises:
- a first code generator, having a shift register with linear feedback, for generating a first pseudo-random code;
- a second code generator, having a shift register, for generating a second pseudo-random code; and
- a code samples selector, coupled to outputs of the first and second code generators, for selecting sample meanings of the current pack from the combined outputs of the first and second code generators;
- wherein advancing the code samples selector and the first and second code generators is controlled by output of the code NCO.

14. The receiver of claim 7, wherein the acquisition engine comprises:
- an input buffer, coupled to the correlator channels, for storing a batch of accumulations;
- a fast Fourier transform (FFT) means, coupled to the input buffer, for calculating a complex frequency spectrum of the batch of accumulations; a power calculator, coupled to the FFT, for calculating power values as sums of squares of the complex frequency spectrum components;
- an adder, coupled to the power calculator, for calculating sums of current power values and previous non-coherent accumulations;
- a previous accumulations buffer, coupled to the common RAM and the adder, for storing non-coherent accumulations;
- a current accumulations buffer, coupled to the adder and the common RAM, for storing current non-coherent accumulations; and
- a threshold detector, coupled to the adder and the common RAM, for checking whether the current non-coherent accumulations exceed a predetermined threshold, and for outputting numbers of the search bins, when the threshold is exceeded, to the common RAM.

15. The method of increasing speed of digital correlation processing for use in a global positioning system (GPS), the method comprising:
- producing a plurality of digital samples of a received GPS signal at an intermediate frequency;
- down-converting and low-pass filtering the digital samples to become baseband digital samples;
- storing a plurality of packs of a predetermined number of baseband digital samples;
- calculating correlations between the packs of baseband digital samples and a plurality of packs of generated signal replica samples to generate a plurality of signal parameters accordingly;
- calculating a fast Fourier transform (FFT) of the correlations;
- calculating incoherent accumulation of results of the FFT;
- comparing the results of the FFT against a threshold; and
- storing the correlations, a correlator channel status when the threshold is exceeded, and a correlator channel setting into a common random access memory (RAM).

* * * * *